United States Patent [19]

Templeton

[11] 4,068,212

[45] Jan. 10, 1978

[54] METHOD AND APPARATUS FOR IDENTIFYING CHARACTERS PRINTED ON A DOCUMENT WHICH CANNOT BE MACHINE READ

[75] Inventor: William B. Templeton, Howell, Mich.

[73] Assignee: Burroughs Corporation, Detroit, Mich.

[21] Appl. No.: 573,787

[22] Filed: May 1, 1975

[51] Int. Cl.² .................................................. G06K 9/00
[52] U.S. Cl. ............................... 340/146.3 ED; 271/64
[58] Field of Search .............. 340/146.3 C, 146.3 AH, 340/146.3 ED, 146.3 H, 146.3 B; 209/DIG. 2, 111.8, 111.7; 101/103; 346/78; 358/296; 271/64

[56] References Cited

U.S. PATENT DOCUMENTS

| | | | |
|---|---|---|---|
| 3,108,694 | 10/1963 | Crain et al. | 209/111.8 |
| 3,156,894 | 11/1964 | Greanias | 340/146.3 ED |
| 3,170,139 | 2/1965 | Rabinow | 340/146.3 R |
| 3,264,610 | 8/1966 | Rabinow | 340/146.3 ED |
| 3,271,738 | 9/1966 | Kamentsky | 340/146.3 ED |
| 3,347,367 | 10/1967 | Smith | 209/111.8 |
| 3,408,458 | 10/1968 | Hennis | 340/146.3 AH |
| 3,444,517 | 5/1969 | Rabinow | 340/146.3 B |
| 3,506,963 | 4/1970 | Dohler et al. | 340/146.3 AH |
| 3,611,291 | 10/1971 | Frank | 340/146.3 Z |
| 3,659,840 | 5/1972 | Ruck | 271/64 |
| 3,786,237 | 1/1974 | Postal | 340/146.3 B |
| 3,972,522 | 8/1976 | Wallace | 271/64 |

*Primary Examiner*—Leo H. Boudreau
*Attorney, Agent, or Firm*—Robert C. J. Tuttle; Charles P. Padgett, Jr.; Carl Fissell, Jr.

[57] ABSTRACT

A method and apparatus for identifying a character which cannot be machine read so that an operator may observe the identified character and make the necessary correction. A document such as a bank check or the like which has a field of encoded characters thereon is moved along a transport path to a read station. When the read station is unable to identify a character, a "can't read" or reject signal is generated and this reject signal can be used to locate the identified character which cannot be machine read for later use. The document then proceeds to a marker station and when the reject character is properly positioned with respect to the printing station, a single wire dot printer mechanism is used to place a mark or dot above or below the character which could not be machine read or in some other suitable location which will positively identify the character which could not be machine read.

1 Claim, 8 Drawing Figures

METHOD AND APPARATUS FOR IDENTIFYING CHARACTERS PRINTED ON A DOCUMENT WHICH CANNOT BE MACHINE READ

BACKGROUND OF THE INVENTION

This invention relates generally to systems for reading characters, and more particularly to character reading systems wherein operators are employed to assist in identifying characters which cannot be machine read for making the necessary corrections.

Today's character readers have become more and more sophisticated and both optical character recognition systems and magnetic character recognition systems are used extensively. These systems have become more and more accurate and multiple read stations and error checkings have improved the accuracy of such systems considerably. There still exists, however, situations in which the machine is unable to recognize a character. In such a circumstance, the character reader must notify the operator in some manner that a character has been rejected so that the operator can assist the system in identifying the proper character.

Early systems which failed to recognize a particular character halted the operation of the entire system so that the operator could remove the document, observe the last character presented to the system for recognition, and identify the character which should have been read. The operator then placed the document in a printing position and used a keyboard to supply the system with the correct identification signal. The document would then be re-inserted and the correct character read before the system would continue until the next failure occurred. This, of course, was highly inefficient and made high speed operation impossible.

Several systems of the prior art employed rather complex and sophisticated video equipment which provided the operator with a CRT display of the characters on the document and an indication of the address of a reject character. The operator was able to determine the proper identity of the rejected character and index the proper identifying signal for later re-encoding by the system. This resulted in much greater efficiency but the cost and complexity of such systems is usually prohibitive.

SUMMARY OF THE INVENTION

It is, therefore, an object of the present invention to provide an improved low-cost and relatively simple high speed character reading system adapted to receive operator assistance without interrupting the operation of the character reader.

It is a further object of the present invention to provide a character reading system wherein the character which could not be machine read is marked directly on the document itself for visual observation by an operator.

It is still another object of the present invention to provide an improved character reading system employing a marking device which places a mark in a location which will distinctly identify the machine unreadable character so that an operator can observe the identifying mark, properly identify the character, and store or re-encode the character for future identification purposes.

It is a further object of the present invention to provide an improved character reading system wherein a mark is physically placed on the document itself in the location which will identify the machine unreadable character and the mark is of such a nature that it will disappear after a period of time.

It is still a further object of the present invention to place a mark in a location on the document which will distinctly identify the machine unreadable character, the mark being of such a nature that it would be visible to the human eye only by use of some special form of radiation or the like.

It is yet a further object of the present invention to provide, in an improved character reading system, the combination of a marking station wherein a mark is placed on the document itself in a location which will distinctly identify the machine unreadable character with an operator view station wherein the document is positioned for full viewing by an operator who is able to view both the identifying mark and the machine readable character for visually determining the proper identity of the character and indexing the proper character for storage and/or later re-encoding at the proper reject character address.

These and other objects and advantages of the present invention are provided in a character reading system wherein a document such as a bank check or the like which has included thereon an encoded field of characters which are to be machine read is transported along a document path toward a read station. When a particular character cannot be machine read, a "can't read" or reject signal is generated for later use. The document then proceeds to a marker station and when the reject character is properly positioned before the printing station of a single wire dot printer, a mark is placed on the document itself which will positively identify the machine unreadable character. The nature of the mark may be such that it is permanently visible to the human eye, such as red fluorescent ink or the like, or it may be of such a nature so as to disappear after a predetermined period of time. Similarly, the mark could be of such a nature so as to be visible to the human eye only by use of some special form of radiation or the like. The marked document could then be transported to an operator viewing station and if a reject character has been marked on the document, it could be pulled from the normal document path and positioned at a viewing station to provide the operator with a full view of the mark and the identified machine unreadable character associated therewith. The operator could then visually determine the true identity of the marked reject character which was not machine readable and could index the proper character for storage and/or later re-encoding. The document would then be reinserted into the transport path and would pass through an encoding station where the correct operator-indexed character would be re-encoded in the reject character address before the document was allowed to proceed further along the transport path.

BRIEF DESCRIPTION OF THE DRAWINGS

Other objects, advantages and features of this invention will become more fully apparent from the following detailed description, appended claims, and accompanying drawings in which like reference numerals designate corresponding parts:

DETAILED DESCRIPTION OF THE DRAWINGS

Figure 1:
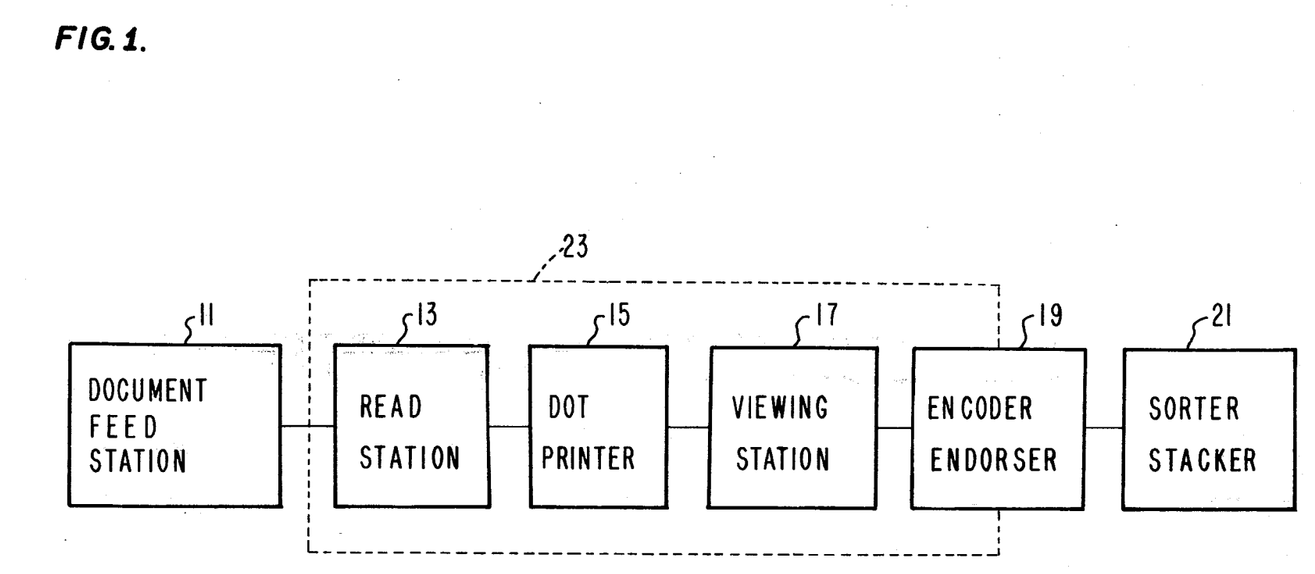
FIG. 1 illustrates a block diagram of a document reader system employing the present invention.

FIG. 1 is a block diagram of a modular document processing system for proof encoding applications. Block 11 represents a document feed station which may be, for example, an automatic demand feed module or a drop and align feed station which supplies documents to a character read station as represented by block 13. The characters on the document can be read at the read station of block 13 via either MICR or OCR techniques and the documents are then supplied to a dot printer station as represented by block 15. The dot printer of block 15 may be, for example, a single wire dot printer, an ink jet printer or the like and is used to physically mark the document at a location which will identify a character which would not be machine read by the apparatus of the read station of block 13. The marked documents are then supplied to an operator viewing station which is represented by block 17 and an operator is able to view both the mark and the character which the mark identifies as having been machine unreadable. The operator is able to visually observe the proper identity of the character and could enter the correct character identification via an auxiliary keyboard or the like for storage on magnetic tape for later reconciliation purposes, for various other processor-associated functions, or for use in re-encoding the proper character when the document is transported to an encoder-endorser station represented by block 19. If the document is to be re-encoded with the correctly identified character as indexed by the operator, or if the document is to be otherwise encoded with some other information or endorsed under the control of the processor, as known in the art, all of this is accomplished at the encoder-endorser station represented by block 19. The document may then be passed on to a sorter-stacker station as represented by block 21 where the documents may be sorted and/or stacked in accordance with the information read on the documents at the read station 13 and transmitted to a processor which may control the sorting or stacking operation as known in the art. The dotted block 23 represents a portion of the modular document processing system of FIG. 1 which is illustrated in the block diagram of FIG. 2.

Figure 2:
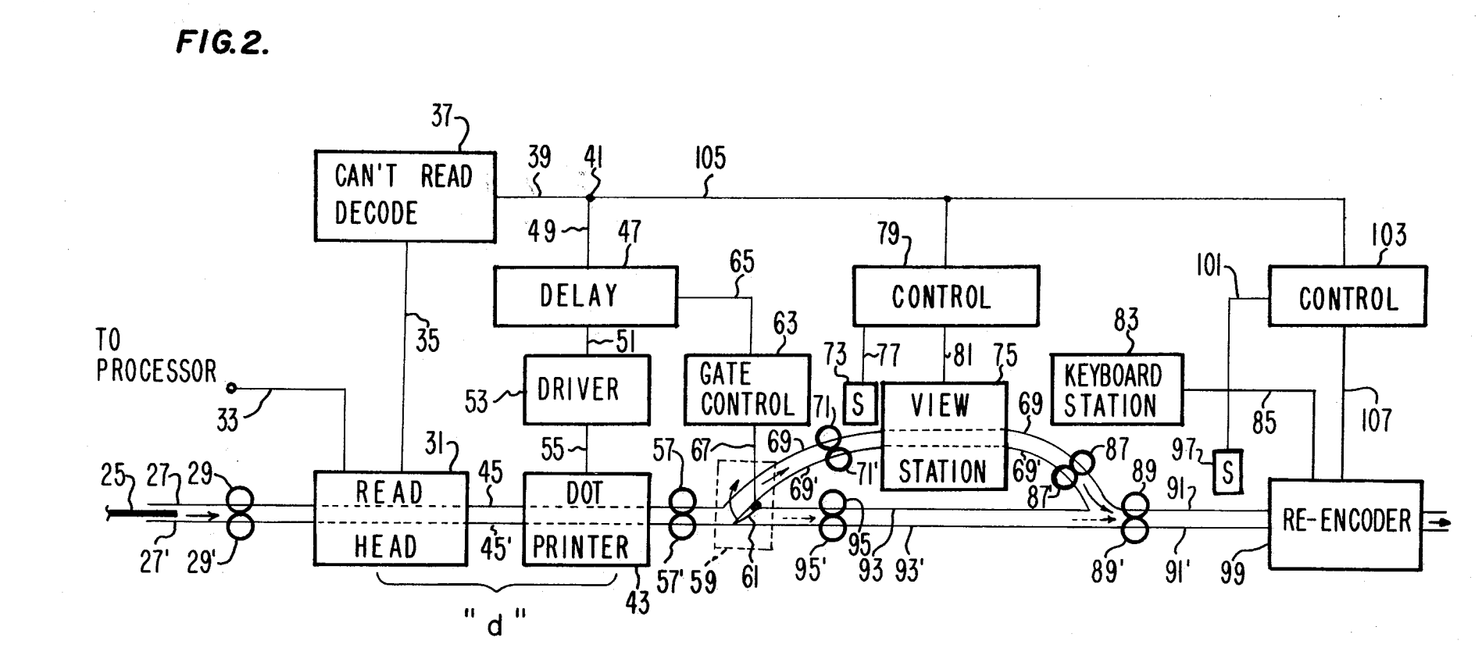
FIG. 2 is a more detailed illustration of the dotted block 23 portion of the block diagram of FIG. 1.

FIG. 2 illustrates a document 25 being driven along a transport path defined by the transport path-defining walls 27, 27' by a pair of drive rollers 29, 29' in the direction of the arrow shown just before the drive rollers 29, 29'. The document would be supplied to a read head assembly which is represented by block 31 and which may be, for example, a typical MICR read head with its associated electrical read circuitry as known in the art, and as shown in a perspective view in FIG. 4.

The read head assembly of block 31 reads each of the characters passing before the head and transmits the signals produced by the head and its associated electrical circuitry, back to a processor, as known in the art, via lead 33. In addition, the signals are supplied via lead 35 to a block 37 which is used to decode a "can't read" or reject signal when the read head assembly of block 31 is unable to read a given character on the document 25.

A signal representing a "can't read" or reject character is outputted from block 37 via a lead 39 and supplied to node 41.

The document passes from the read head assembly of block 31 to a dot printer station represented by block 43 via the transport path defined by walls 45, 45'. A predetermined distance "d" exists between the physical location of the read head assembly of block 31 and the physical location of the printing station of the dot printer of block 43 and since the drive speed of the document 25 from the read head assembly of block 31 along the transport path defined by walls 45, 45' to the dot printer is known since it is controlled by drive means at the read head assembly 31, the time required for a given character position on the document 25 to pass this distance "d" can be calculated. A predetermined time delay representing the time required for a character position to traverse the distance "d" from its position before the read head at which time it was identified as an unreadable character, until it arrives in a printing position before the printing station of the dot printer of block 43 can be established electronically via the delay means of block 47 which is connected to the "can't read" output node 41 via lead 49. When a "can't read" character has been identified at the read head of block 31, a decoded "can't read" signal identifying that particular character or position is supplied via lead 39, node 41 and lead 49 to the delay means of block 47. After the established time delay required for the identified "can't read" character position to traverse the distance "t", the delay means of block 47 will output a signal over lead 51 and cause the dot printer of block 53 to initiate a drive signal over lead 55 and cause the dot printer of block 43 to place a mark physically on the document in a position which will positively identify the character which could not be machine read by the read head of block 31. This identifying mark may be placed either above or below the character or in any location which serves to uniquely identify the "can't read" character and may be of flourescent ink, colored ink, disappearing ink or ink which is only visible under special forms of radiation or the like. The document having been so marked by the dot printer of block 43, is then drivably engaged by the drive roller means 57, 57' and may then be transmitted to a gating station as represented by dotted block 59. The gating station of block 59 includes a gate-like path selection member 61. The path-selecting gating element 61 can be positioned by the gate control circuitry of block 63 which could respond to a second delay signal from the delay means of block 47 via lead 63 or to a signal from the processor or from node 41 via means not illustrated but known in the art so as to control the positioning of the path-selecting gating element 61 via coupling path 67 so as to position the path-selecting gating element 61 in a first position, as shown in FIG. 2, in response to a signal indicating that the document 25 currently arriving at the gating station 59 contains a marked "can't read" character so as to divert the document 25 into a first transport path defined by walls 69, 69' in the direction of the solid arrow between the walls 69, 69' such that the document 25 which contains a marked "can't read" character is then driven via driving means 71, 71' past a sensing means 73 to an operator viewing station as indicated by block 73. When the sensing means of block 75 indicates that the document 25 having one or more marked "can't read" characters thereon has reached a predetermined position before the viewing station of block 75, a signal will be sent via lead 77 to the control logic of block 79. Although the control block 79 is shown as being coupled only to the "can't read" node 41 via lead 105, it will be understood that the logic of block 79 could be under the control or partial control of the system's processor, as known in the art. The control logic of block 79 will operate to physically control the positioning of the document at the viewing station of block 75 via lead 81 so that the entire document or at least that portion of the document containing the mark and the "can't read" character can be fully viewed by the operator. The control logic of block 79 may be realized from the teaching of Holmes, et al, U.S. Pat. No. 3,872,433, and specifically from the teaching headed "Transport Path Controls" beginning in column 29, line 60, which is expressly incorporated herein by reference. The view station 75 could be an elevated data path having transparent walls 69, 69'. The operator visually observes the mark and the "can't read" or reject character associated therewith; determines the correct identity of the marked character; and enters the correct character via a keyboard station or some similar means as represented by block 83. The corrected character which is entered via the keyboard of block 83 could be stored on magnetic tape for future reconciliation runs or could be forwarded via a lead 85 to a down line encoder station 99 for re-encoding the proper character should it be so desired to do so. The keyboard station 83 would normally be coupled to the system processor, as known in the art, but such a coupling is assumed in the diagram of FIG. 2 but not expressively shown. Once this viewing operation has been accomplished, the document 25 is reinserted into the viewing station transport path defined by walls 69, 69' either manually by the operator or by some mechanical means as disclosed in the above-cited copending application either under the control of the logic of block 79 or under processor control. The document 25 is then engaged by the drive roller means 87, 87' and transported in the direction of the solid arrow toward drive rollers 89, 89' and into the main document transport path defined by walls 91, 91' for further processing. If it was determined by the read head assembly of block 31 that the document 25 did not contain a "can't read" character, the gate control logic of block 63 would operate to position the path-defining gate element 61 in an upward position as defined by the arrow touching the gate element 61 so as to allow the document 25 to travel in the direction of the dotted arrow into a second bypass transport path defined by walls 93, 93'. This is a bypass transport path and the document 25 would be driven therethrough by drive rollers 95, 95' until the document engaged the drive means 89, 89' and entered into the main transport path defined by walls 91, 91' as previously described. It will be apparent to those skilled in the art that the reinsertion of the documents 25 into the transport path 69, 69' can be timed by the logic of block 79 or the processor or some other means to avoid jams with the unmarked documents traveling along the bypass transport path 93, 93'. Similarly the bypass path can be eliminated entirely and all documents could pass through the viewing station of block 75 with only those bearing "can't read" identifying marks thereon being delayed or lifted for viewing purposes. In either case, the viewing station 75 could be provided with a means for holding incoming documents without jams while preceding documents are being viewed.

The document 25 could then travel past a second sensing means 97 and thence to a re-encoder station as illustrated by block 99. The sensing station 97 would indicate that the document 25 was in a predetermined position with respect to the print station of the re-encoder of block 99 and would transmit a signal indicative of this fact via path 101 to the control logic of block 103, which may be of the type disclosed in U.S. Ser. No. 608,567, filed Aug. 28, 1975 by Templeton and assigned to the assignee of the present invention. Block 103 would receive a signal via lead 105 would would inform the control logic of block 103 whether or not the document 25 presently being sensed by the sensing means of block 97 contained a "can't read" character or the processor could supply this information to block 103 directly to the re-encoder 99. If the document 25 did not contain a "can't read" character, the control logic of block 103 would allow the document to pass through the re-encoder station 99 via a signal transmitted over path 107 or a bypass path could be provided as previously discussed with respect to the viewing station 75, but if a "can't read" character was present on the document 25 currently passing the sensing means of block 97, the control logic of block 103 could pass a signal over lead 107 causing the re-encoder station of block 99 to re-encode the correct character which was indexed by the operator at the keyboard station of block 83 and identified to the re-encoder of block 99 via lead 85 so as to cause the re-encoder to print the correct character in the correct character location on the document 25 before allowing the document 25 to proceed along the document path in the direction of the arrow at the output of the re-encoder block 99 for further document processing, sorting, stacking, endorsing, or the like, as known in the art.

Figure 3:
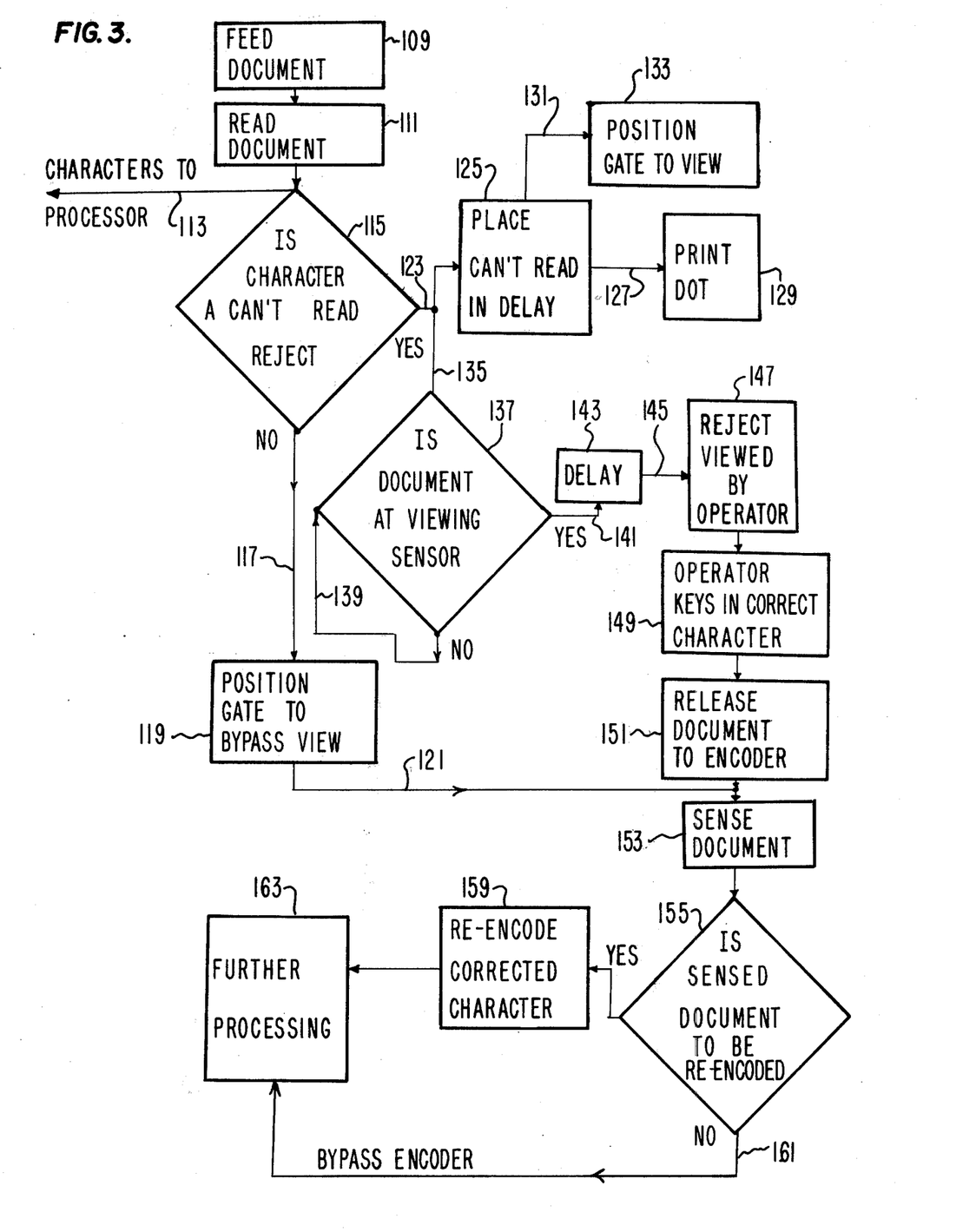
FIG. 3 is a flow diagram to set forth the operation of the system depicted in FIG. 2.

The operation of the system of the present invention can best be described by reference to the flow diagram of FIG. 3. The document is originally fed into the system as represented by block 109. It is then transported to a read station at which time the characters on the document are read as indicated by block 111. All of the characters read during the reading operation are provided to a processor as known in the art as indicated by the arrow 113. A decision which is represented by block 115 is then made as to whether or not the character currently being read at the read head 31 is a "can't read" or reject character. If none of the characters on the document currently being read by the read head 31 are identified as "can't read" characters, the NO path designated by the reference numeral 117 is followed and block 119 insures that the gating element 61 is positioned so as to allow the document 25 to bypass the viewing station 75 and arrive in the main transport path defined by walls 91, 91' as indicated by the flow line labeled 121. For each of the characters read by the read head 31 which are decoded by the block 37 as "can't read" reject characters, the YES path identified by the reference numeral 123 is followed and the following three events occur. First, a signal indicative of each "can't read" character is placed in the delay means of block 47 as illustrated by the block 125 of the flow diagram of FIG. 3, and at the end of the predetermined delay time, flow line 127 to the print dot operation block 129 indicates that the dot printer of block 43 of FIG. 2 then marks the "can't read" or reject character for identification purposes. Secondly, an extra delay could be placed in the delay logic of block 47 or otherwise effected and, as represented by flow path 131, at the end of the delay the operation block 133 would come into effect, representing that the gate control circuit of block 63 caused the path-defining gating element 61 to change positions so as to divert the document 25 into the document transport path 69, 69' which leads to the viewing station of block 75. Thirdly, once the document has been diverted toward the viewing station of block 75, the flow path represented by lead 135 takes effect and a decision is made in decision block 137 as to whether or not the document which has been identified as containing a marked "can't read" character and which has been diverted toward the viewing station, has yet to arrive at the sensing position of sensor 73. If the answer is NO the flow path represented by lead 139 indicates that the cycle continues until the document arrives at the sensing station 73. At this point the YES path represented by lead 141 is followed and a delay is initiated by the control logic of block 79 as represented by block 143 of FIG. 3. After the predetermined delay has elasped, the document arrives at the viewing station of block 75 as indicated by the flow path 145 and the identified "can't read" or reject character is viewed by an operator as represented by block 147. The operator visually identifies the marked character; correctly identifies the character which was supposed to have been machine read; and then enters the correct character designation as represented by block 149. The document is then released to the main document transport path defined by walls 91, 91' and this is represented by block 151 of FIG. 3 and the location of the document before the re-encoder station is then sensed as by the sensor 97 as represented by the flow diagram block 153 and decision block 155 comes into play. If the document which has been sensed by the sensing means 97 is a document which contains a "can't read" or reject character which is to be re-encoded, the YES path 157 of the flow diagram is followed and the correct operator indexed character is re-encoded in the proper position at the re-encoder of block 99 as represented by the flow block 159 of FIG. 3. If the document which was sensed at the sensor 97 is not to be re-encoded, the NO path 161 of the flow diagram is followed and the re-encoder 99 is bypassed. In either event, the document would then be further transported for further document processing as may be represented by block 163 of the flow diagram where further encoding, endorsing, sorting or stacking operations could be effected as known in the art under the control or information from the processor or the like.

Figure 4:
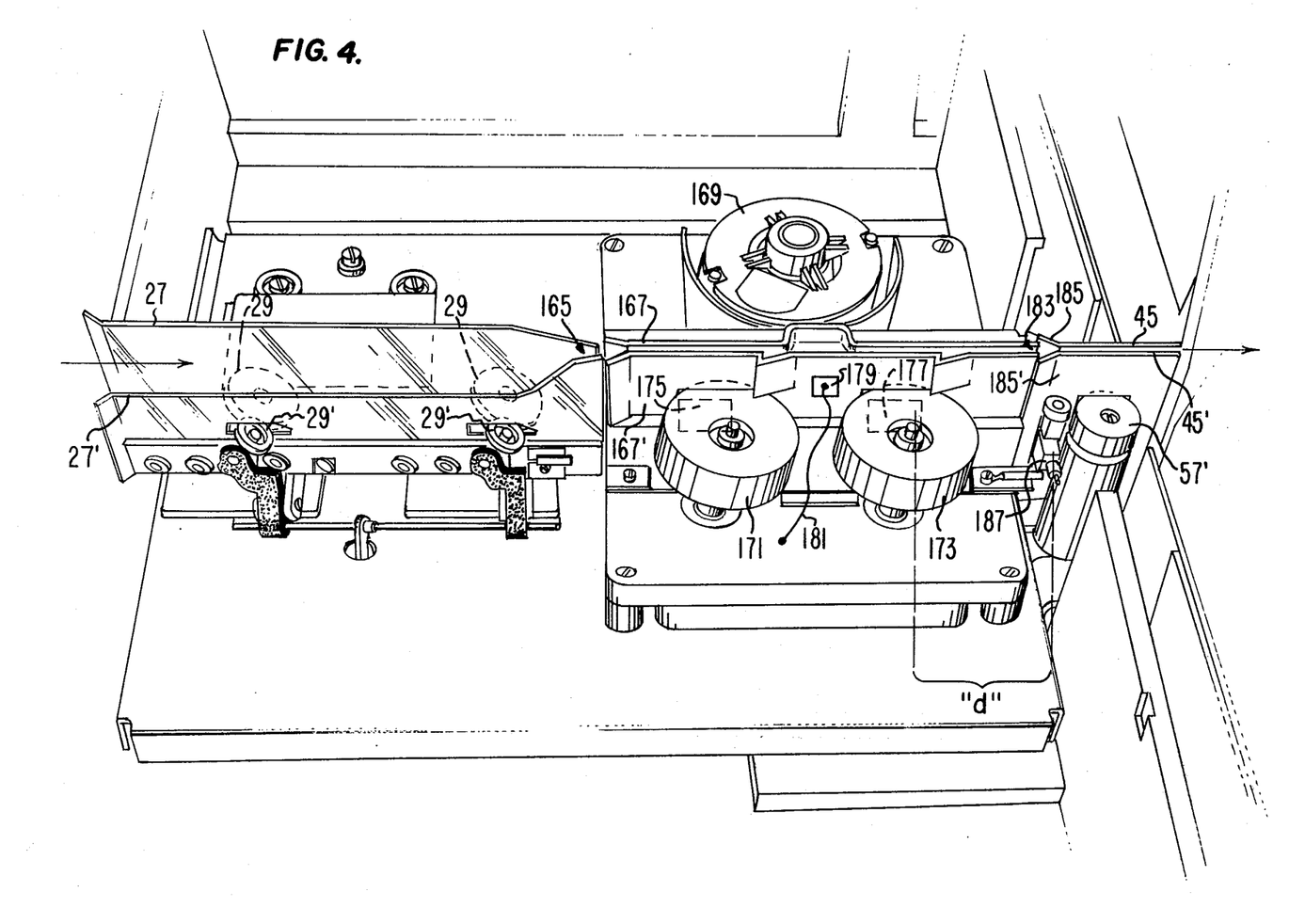
FIG. 4 is a perspective view of the read station and dot printer of the present invention.

FIG. 4 represents a perspective view of a portion of the block diagram of FIG. 2 and shows a portion of the document transport path 27, 27', the drive means 29, 29', the read head assembly 31, and the dot printer of block 43. The unit illustrated in FIG. 4 could constitute a single read module of the modular document processing system of FIG. 1. FIG. 4 illustrates an incoming document transport path defined by the document transport path-defining walls 27 and 27'. A pair of drive means designated 29, 29' are illustrated in the diagram of FIG. 4, which may be, for example, a slip drive wheel-idle roller combination, as known in the art, or any similar drive means usable to transport documents along a transport path. At the inwardly tapered end of the transport path defined by walls 27, 27', and broadly indicated by the reference numeral 165 on the illustration of FIG. 4, the document 25 would enter the read station assembly 31 via the read station transport path defined by walls 167, 167'. A motor 169 could be used to drive a first and second document transport drum 171 and 173 respectively at a constant speed so as to insure a relatively constant drive speed of the document through the read station. The document transport drums could be driven at a relatively precise speed by an AC synchronous motor 169 via timing belts or gear arrangements under the read station assembly of block 31 of FIG. 2, as known in the art. The read station assembly could be any type of read station known in the art and capable of reading OCR or MICR characters from a document. A write head 175 is located within the rear station transport path defining wall 167 or near its inwardly facing base at a location directly opposite but below a center line drawn through the first document transport drum 171 and perpendicular to the read station transport path and the read head 177 is located in the read station document transport path wall 167 or near its inwardly facing base at a location directly opposite but below the second document transport drum 173 along a line drawn through its center and perpendicular to the read station document transport path 167, 167'. A document detector 179 is located between the document transport drums 171 and 173 and could comprise an LED and photodector assembly or the like which sends a signal indicative of the presence of a document via lead 181 to the processor or to the read head circuitry of block 31 of FIG. 2 to inform the read head assembly that a document is approaching the read station 177. After the document passes the read head 177, it exits the read station transport path defined by wall 167, 167' at the read station document transport path exit broadly designated by reference numeral 183 and enters a document transport path leading to the dot printer of block 43 of FIG. 2 which is defined by document transport path-defining walls 45 and 45'. The input to the document transport path defined by walls 45 and 45' includes a pair of inwardly tapered document transport path entry members 185, 185' to insure that the document passes into the printer transport path defined by walls 45, 45'. A dot printer-inker assembly 187 is located adjacent the walls 45, 45' and the printing station of the dot printer-inker assembly 187 is located a fixed distance "d" from the read station 177 so that the fixed velocity drive from the document transport drum 173 will insure that the character read at the read head 177 reaches the printing station of the dot printer-inker assembly 187 at a precise time interval after having been read at the read head 177 as previously described. An ink reservoir and inking nib are positioned, as indicated by the reference numeral 187, adjacent the wall 45' and a solenoid-actuated dot printer, not shown, is positioned opposite the inking reservoir of the dot printer-inker assembly 187 on the other side of wall 45. After the dot printer 187 has been energized and a mark has been placed on the document so as to identify the machine unreadable reject character, the document is drivably engaged, if it has not already been so engaged, by feed roller means 57, 57' which are timed or synchronized to the transport drums 171, 173, only drive roller 57' being shown in the illustration of FIG. 4, and driven in the direction of the arrow along the document transport path defined by walls 45, 45' as previously described.

Figure 5:
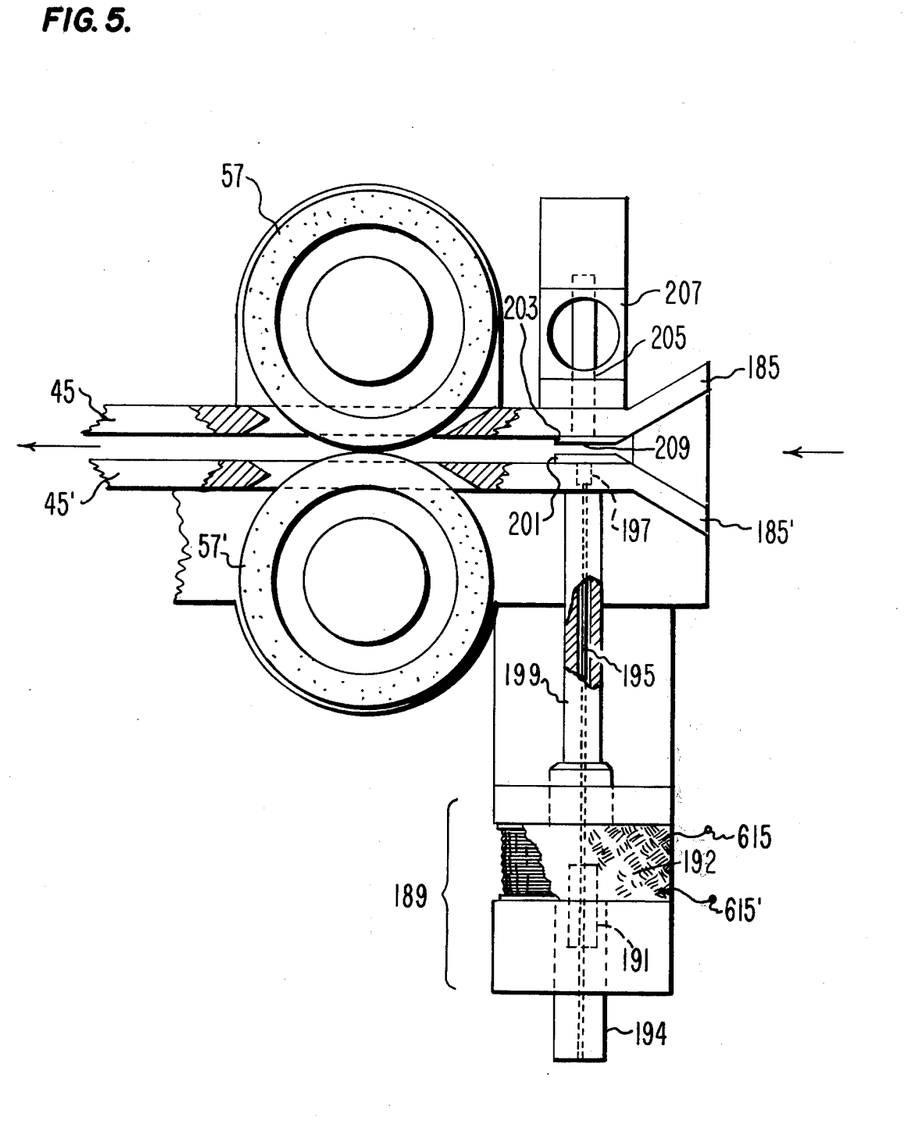
FIG. 5 is a plan view of the dot printer apparatus usable in the present invention.

FIG. 5 illustrates a top view of the wire printer-inker assembly 187 of FIG. 4 which could be utilized in the present invention. It will be understood by those skilled in the art that any type of dot printer could be utilized to place a mark on the document itself in a physical position for uniquely identifying the character which has been determined to be machine unreadable (at least for this particular read attempt) such as a wire printer, an ink jet printer, a bed and platen type printer or the like. The top view of the single wire dot printer assembly of FIG. 5 shows broadly one type of dot printer utilizable in the system of the present invention. The inwardly sloping document path input elements 185, 185' are shown to illustrate the input of the document transport path defined by walls 45, 45' which transport the document past the printing station. The document enters the transport path defined by the walls 45, 45' in the direction of the arrow at the outwardly turned ends 185, 185' and exits at the opposite end in the direction of the arrow. A drive solenoid 189 houses a plunger member 191 which can be pulled into or out of a solenoid coil 192 by driving the solenoid with the circuit of FIG. 8 via coil 615, 615' the plunger member element 191 being normally biased out of the center of the coil 192 by a spring element, not shown but known in the art. The armature or plunger member 191 is rigidly secured to a central portion of a wire member 195. The opposite end of the wire member is attached to a dot-making cylindrical hammer means 197 and the wire 195 may be guided or protected by a channel forming sleeve means 199 or the like to prevent buckling as known in the art. A print station-defining element having a channel for the passage of the dot forming print hammer 197 is designated by reference numeral 201 and is affixed to the inner side of the document transport path-defining wall 45' while corresponding print station-defining element 203 is affixed to the inner side of the opposite transport path defining wall 45 in a cooperative relationship with the member 201. The solenoid 189 also includes a rearwardly extending guide means 194 for protecting the wire 195 and core 191 such that the core 191 is normally biased out of the center of the coil 192 and into guide means 194 but when energized by a drive pulse at inputs 615, 615', the core 191 is pulled into the center of the coil 192 causing the wire 195 to strike the hammer element 197 against the document. An inking nib member 205 extends through the aperture of the station-defining member 203 to transport ink from an ink reservoir 207 to the end 209 of the nib 205 which is a parallel to the inner transport surface of the print station-defining element 203. Printing of the dot is accomplished when the document passes before the print station-defining elements 201, 203, and the solenoid 199 is energized to cause the wire 195 to press the hammer member 197 against the document causing the opposite side of the document to contact the end 209 of the inking nib 205 causing a dot to appear thereon. Since the actuation of the solenoid 189 is controlled electrically so as to insure that the dot is printed so as to properly identify the "can't read" character, precision control is maintained. As mentioned previously, the ink in the ink reservoir 207 may be disappearing ink, flourescent ink or the like depending upon the later use to which the documents will be put. If, for example, the document may be handled by humans at a later time, the presence of a marking dot may cause confusion since the viewer will be unable to determine whether or not the machine unreadable character has been corrected. This, of course, can be avoided by using a disappearing ink which would disappear shortly after the document leaves the viewing station or by using an ink which would be visible only under a special form of radiation. It may also be advisable, to aid the operator in identifying a character, to use a bright colored flourescent ink or the like for ease of identification. Any of these could be used with the present invention. After the document has been physically marked to identify each "can't read" character located thereon, the document passes further along the transport path defined by the walls 45, 45' and is drivably engaged by drive wheel means 57, 57' for driving the document further along the path in the direction of the arrow.

Figure 6:
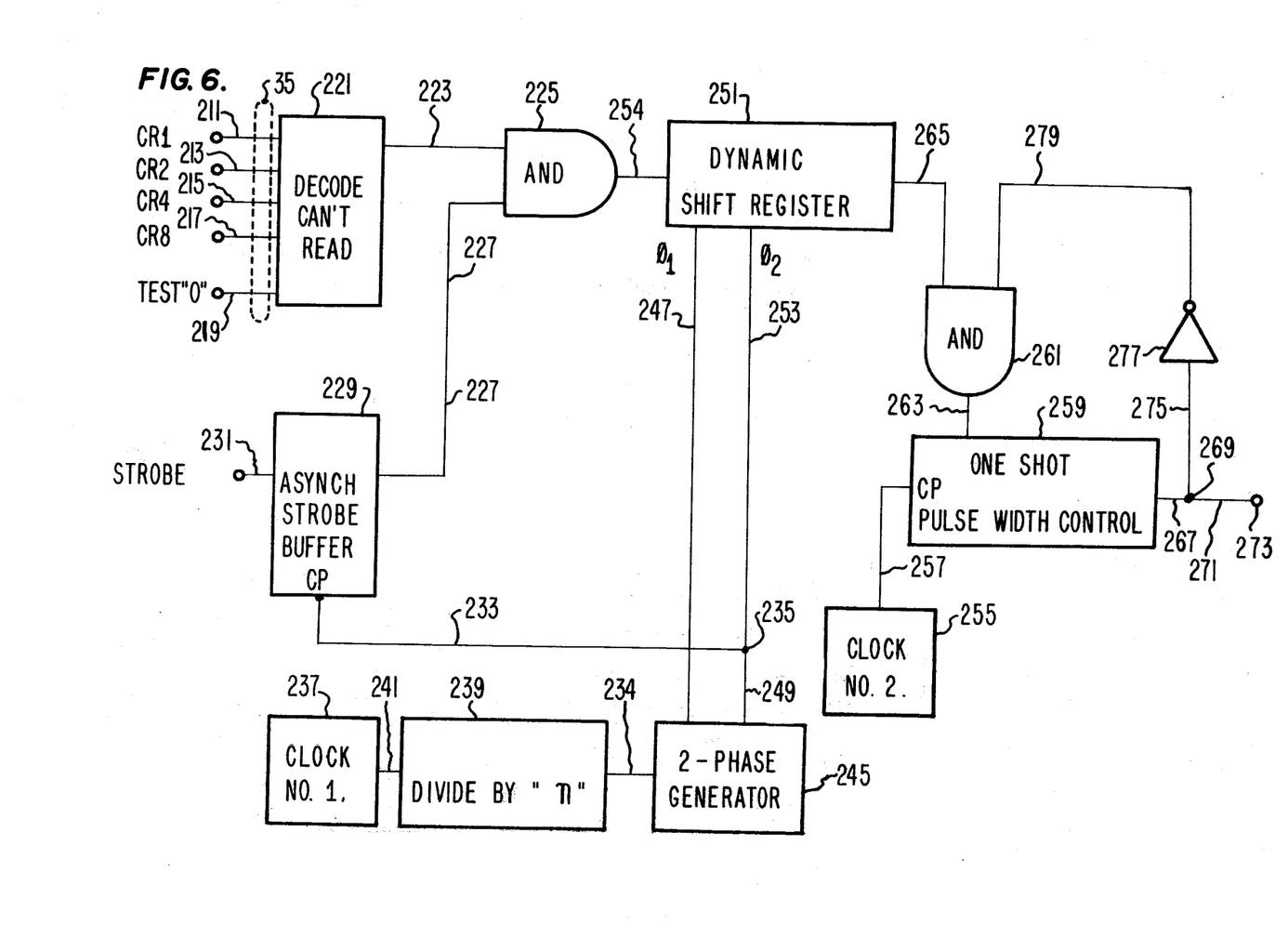
FIG. 6 is a simplified block diagram of the electrical circuitry associated with the read station and dot printer of the present invention.

FIG. 6 shows a block diagram of the logic associated with blocks 37 and 47 of the circuit of FIG. 2. The group of input leads represent the lead 35 running from the read head assembly of block 31 to the "can't read" decode block 37 of FIG. 2. Lead 211 receives the character read signal CR1; lead 213 receives the character read signal CR2; lead 215 receives the character read signal CR4; and lead 217 receives the character read signal CR8. Lead 219 is used to provide a test signal for testing the ability of the decode "can't read" signal circuitry of block 221. Block 221 will output a signal over lead 223 only when a "can't read" signal has been decoded and a machine unreadable reject character has been identified. Lead 223 serves as one input of an AND gate 225 whose other input is connected via lead 227 to the output of an asynchronous strobe buffer represented by block 229. The input 231 of the asynchronous strobe buffer of block 229 receives the signal STROBE and a CP clock input is connected via lead 233 to a node 235. A first clock 237 is used to supply clock pulses to a delay control or divide by "$n$" counter means represented by block 239 via lead 241. The output of the divide by "$n$" counter means of block 239 is supplied via lead 234 to the input of a two-phase generator represented by block 245. The circuitry within this block supplies a signal $\phi_1$ at a first output lead 247 and a second phase signal $\phi_2$ which is out of phase with respect to $\phi_1$ at a second output lead 249. Lead 247 connects to the phase one input of a dynamic shift register 251. The $\phi_2$ output of the two-phase generator 245 is connected via output lead 249 to node 235 and is thence supplied to the CP clock input of the asynchronous strobe buffer 229 via lead 233 and via lead 253 to the phase two input of the dynamic shift register of block 251. The primary input to the dynamic shift register 251 is taken from the output of AND gate 225 via lead 254.

A second oscillator or source of clock pulses is represented by block 255 and supplies clock pulses via lead 257 to the pulse width control logic of block 259. The start input of the pulse width control logic of block 259 is taken from the output of an AND gate 261 via lead 263. One input of AND gate 261 is taken via lead 265 from the output of the dynamic shift register of block 251 and the other input of AND gate 261 receives an inverted output signal from the pulse width control logic of block 259. The output of block 259 is connected via lead 267 to an output node 269. Output node 269 is connected via lead 271 to a print driver terminal 273 and via lead 275 to the input of an inverter 277 whose output is coupled via lead 279 to the second input of AND gate 261. The operation of the block diagram of FIG. 6 will be described hereinafter after a brief description of the schematic diagrams of FIGS. 7 and 8.

Figure 7:
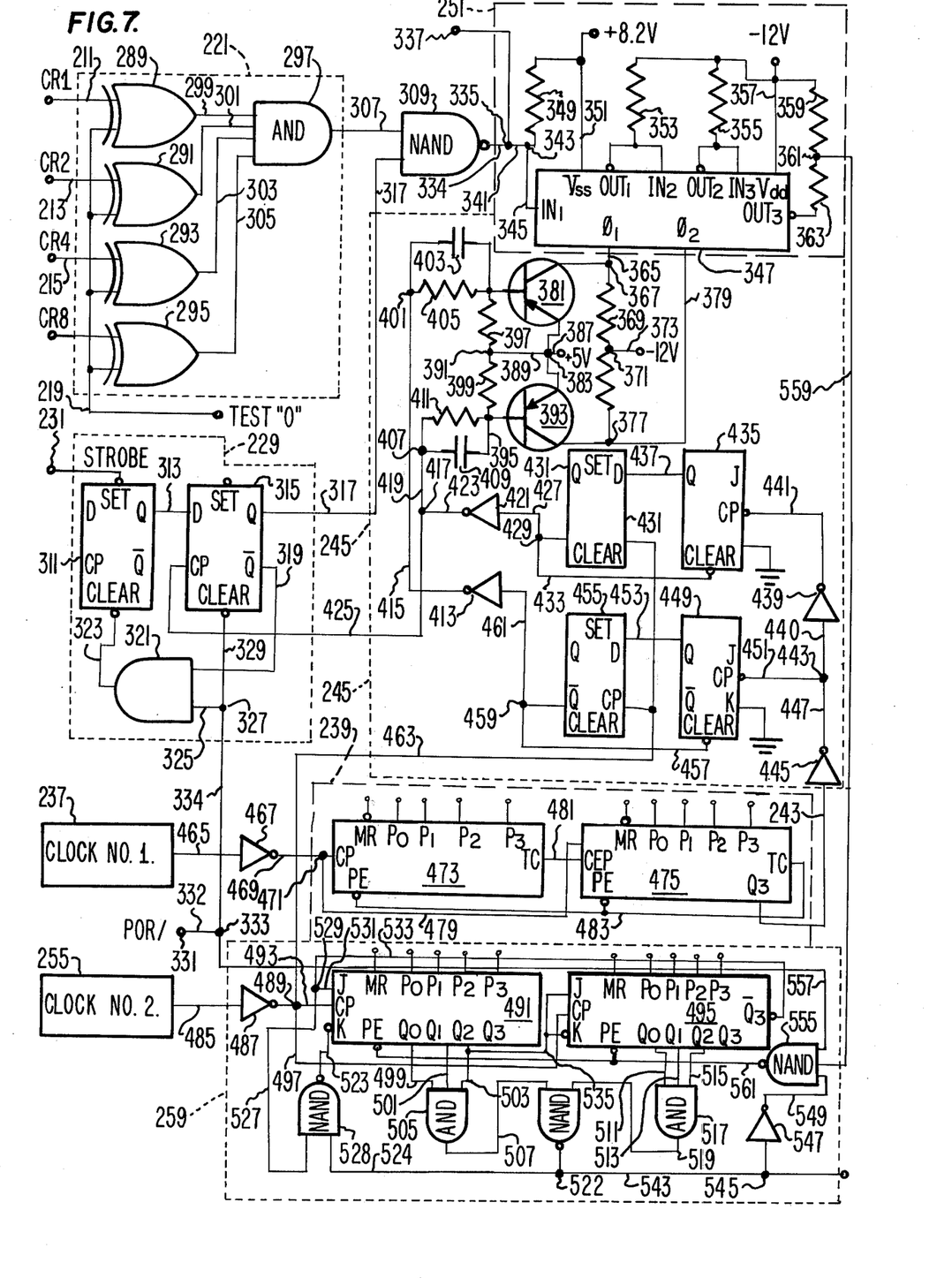
FIG. 7 is a schematic diagram of the circuitry of the detailed block diagram of FIG. 6.

FIG. 7 is a schematic circuit diagram of the block diagram of FIG. 6 with the corresponding blocks of FIG. 6 shown as correspondingly numbered dotted blocks in the circuit of FIG. 7. Wherever possible, like reference numerals have been used to designate like elements. The decode "can't read" logic of block 221 contains a set of four exclusive OR gates 289, 291, 293 and 295 respectively. A first input of exclusive OR gate 289 is connected to the CR1 terminal via lead 211; the first input of the exclusive OR gate 291 is connected to the CR2 terminal via lead 213; the first input of the third exclusive OR gate 293 is connected to the CR4 terminal via lead 215; and the first input of the fourth exclusive OR gate 295 is connected to the CR8 input via lead 217. A second input to each of the exclusive OR gates 289, 291, 293 and 295 is supplied via lead 219 from the TEST "0" input terminal so that the output of the exclusive OR gates will be high when either the CR signal from the read head is high or the TEST "0" signal is high but not when both are high or low. The outputs of the exclusive OR gates 289, 291, 293 and 295 are supplied as inputs to an AND gate 297 via leads 299, 301, 303, and 305 respectively. The output of AND gate 297 is supplied via lead 307 to one input of a NAND gate 309. The NAND gate 309 is used in place of the AND gate 225 of FIG. 6 since it is an inherent function of the dynamic shift register enclosed within the dotted block 251, since it contains three inverting stages, to invert its input signal. Therefore NAND gate 309 has been substituted for the AND gate 225 to compensate for this inversion. The asynchronous strobe buffer of block 229 supplies the input pulse STROBE to the "set" input of a D-type flip-flop 311 via lead 231. The STROBE pulse is inputted each time a new character is received at the read head in order to indicate that the data on lines CR1, CR2, CR4, and CR8 is available for reading. This insures that only one STROBE pulse is received for each character which is to be read so that we do not generate a second "can't read" signal for a single character which could not be machine read. The "Q" output of the D-type flip-flop 311 is supplied via lead 313 to the "D" input of a second D-type flip-flop 315 and the "Q" output of the second D-type flip-flop 315 is supplied via lead 317 to the second input of NAND gate 309 so as to provide a phase synchronized strobe pulse to the second input of the NAND gate 309. The "$\bar{Q}$" output of the second D-type flip-flop 315 is supplied via lead 319 to one input of an AND gate 321 whose output is connected to the "clear" input of the first D-type flip-flop 311 via lead 323. The second input of AND gate 321 is taken via lead 325 from node 327 which is connected via lead 329 to the "clear" input of the second D-type flip-flop 315 and to the POR/ input terminal 331 via lead 332, node 333 and lead 334. The signal POR/ is used to initially reset or condition the circuit at turn-on, as known in the art.

The output of NAND gate 309 is supplied via lead 334 to the input node 335 of the dynamic shift register of dotted block 251 and could be supplied to a data output terminal 337 via lead 339. Input node 335 is also connected via lead 341 to a node 343. Node 343 is connected via lead 345 to the $IN_1$ input of a dynamic shift register 347. The dynamic shift register 347 may be, for example, a standard 3X66 MOS dynamic shift register, as known in the art. This device is used to input a "can't read" signal and to dynamically shift this signal through the register until it reaches the output a predetermined time thereafter depending on the speed at which shifting is effected. The dynamic shift register 347 could be generally configured as follows. Node 343 is coupled through a resistor 349 to a +8.2 volt source of potential which is also connected directly to the $V_{ss}$ supply input terminal via lead 351. The $OUT_1$ and the $IN_2$ terminals are commonly coupled together and connected through a resistor 353 to a −12 volt source of potential. Similarly, the $OUT_2$ and $IN_3$ terminals are commonly coupled together and connected through a resistor 355 to the −12 volt source of potential. The −12 volt source of potential is also coupled directly to the $V_{dd}$ input via lead 357 and is connected through a resistor 359 to an output node 361. The output node 361 is connected through a resistor 363 to the $OUT_3$ terminal at the output of the dynamic shift register 347. The dynamic shift register 347 employs a master-slave type two-phase drive system and therefore employs a $\phi_1$ and a $\phi_2$ clock input. The $\phi_1$ clock input is coupled via lead 365 to a node 367. Node 367 is connected through a resistor 369 to a node 371 which is connected directly to a −12 volt source of potential via lead 373. Node 371 is also connected through a resistor 375 to a node 377 which is connected via lead 379 to the $\phi_2$ clock input of the dynamic shift register 347. Node 367 is connected directly to the collector of a transistor 381 whose emitter is connected directly to a node 383 and whose base is connected to a node 385. Node 383 is also connected via lead 387 to a +5 volt source of potential and through a lead 389 to a node 391. Node 383 is also coupled directly to the emitter of a second transistor 393 whose collector is coupled directly to node 377 and whose base is connected directly to node 395. Node 391 is connected through a resistor 397 to base node 385 and through a resistor 399 to base node 395. Base node 385 is coupled to a node 401 via the parallel combination of a capacitor 403 and a resistor 405 and base node 395 is similarly coupled to a node 407 through the parallel combination of a second capacitor 409 and resistor 411. Node 401 is connected directly to the output of an inverter 413 through a lead 415 and node 407 is connected to a node 417 via lead 419. Node 417 is connected directly to the output of an inverter 421 via lead 423 and node 417 is further connected via lead 425 back to the CP clock input of the second D-type flip-flop 315 for clocking or synchronizing the operation of the asynchronous strobe buffer of block 229. The input of inverter 421 is directly connected via lead 427 to the "$\bar{Q}$" output node 429 of a third D-type flip-flop 431. The "$\bar{Q}$" output node 429 is also connected via lead 433 back to the "clear" input of a first JK flip-flop 435. The "Q" output of the first JK flip-flop 435 is connected via lead 437 to the "D" input to the D-type flip-flop 431 and the "K" input to JK flip-flop 435 is grounded. The CP clock input to JK flip-flop 435 is connected to the output of an inverter 439 via lead 441. The input of inverter 439 is taken via lead 440 from node 443 which is connected to the output of an inverter 445 via lead 447 and to the CP clock input of a second JK flip-flop 449 via lead 451. The "Q" output of JK flip-flop 449 is connected via lead 453 to the "D" input to another D-type flip-flop 455 and the "K" input to the second JK flip-flop 449 is connected directly to ground. The clear input of JK flip-flop 449 is connected via lead 457 to the "$\bar{Q}$" output node 459 of the D-type flip-flop 455 and the "$\bar{Q}$" output node is connected via lead 461 to the input of inverter 413 as previously described. The CP clock inputs to D-type flip-flops 431 and 455 are connected to a source of clock pulses via lead 463 and the input to the inverter 445 is taken from the output of the divide by "$n$" counter of dotted block 239 via lead 243. It will be readily apparent to those skilled in the art that other standard types of two-phase counters, dynamic shift registers or strobe buffers could be substituted for the ones hereinabove described.

Block 237 is labeled clock #1 and may contain, for example, a crystal-controlled oscillator which generates relatively precise clock pulses. In the prime embodiment of the present invention, a one megahertz clock was employed. The output of the clock of block 237 is supplied via lead 465 to the input of an inverter 467 whose output is connected via lead 469 to the clock input node 471 of the divide by "$n$" counter means of block 239. The circuit of block 239 includes a first four bit binary counter 473 and a second four bit binary counter 475, each of which could be a standard off-the-shelf TTL9316 device, as known in the art, or any equivalent for performing a similar function. The function performed by the divide by "$n$" counter means of block 239 is that of stepping down the frequency of the clock 237 so as to provide a precisely controlled clock frequency on lead 243 which serves as the input to the two-phase generator of block 245. It is important that the frequency be controlled so aS to insure that the time required for a "can't read" signal which has been inputted into the dynamic shift register of block 251 to be shifted to the output of the dynamic shift register 251 so as to initiate the drive of the dot printer of block 43 is controlled so as to insure that the mark made by the dot printer identifies the proper character which could not be machine read. If the input frequency to the two-phase generator of block 245 is not capable of being controlled within a reasonable degree of accuracy, a mark could be made between characters or even serve to indicate that a correct character was erroneous. The ability to control the number "$n$" by changing the pre-settable inputs to the four bit binary counters 473 and 475 enable this precision to be obtained and if further precision is desired, an extremely precise clock frequency could be used to directly provide the clock signals to lead 243. In addition, if it were so desired, means could be provided to such a precision clock source for adjusting the output frequency so as to compensate for changing system conditions so as to insure that the dot is printed so as to properly identify only the characters which could not be machine read. The pre-settable inputs $P_0$, $P_1$, $P_2$, and $P_3$ of the four bit binary counter 473 and of the four bit binary counter 475 can be selectively connected to a positive source of voltage or to ground so as to enable any count to be preset into the counters, as known in the art, so as to insure the proper frequency output by controlling the value of the number "$n$". The input node 471 is connected directly to the CP clock input of counter 473 and is connected via lead 479 to the CP clock input of counter 475. The terminal count TC output of counter 473 is connected via lead 481 to the CEP input of counter 475 and the terminal count TC output of counter 475 is connected via lead 483 to the PE parallel enable inputs of counters 473 and 475 to enable the preset of the counters, as known in the art. The "$Q_3$" output of the counter 475 serves as the output to the divide by "$n$" counter and is connected via lead 243 to the input of inverter 445. In one embodiment of the present invention, the one megahertz frequency of clock 237 was divided by "$n$" where $n = 187$ so as to produce an output frequency on lead 243 of 5348 Hertz which was found to be sufficient to insure proper marking of the document in the system then being tested. As known in the art, the number "$n$" was set equal to 187 by connecting the preset inputs $P_0$, $P_1$, $P_2$ and $P_3$ to either a positive source of voltage so as to preset a binary one in their respective locations or to ground so as to preset a binary zero into their respective positions thereby converting the two standard four bit binary counters 473 and 475 into a divide by 187 counter. The actual connections are not shown in FIG. 7 due to spacing limitations but are well known depending on the desired value of "$n$".

Figure 8:
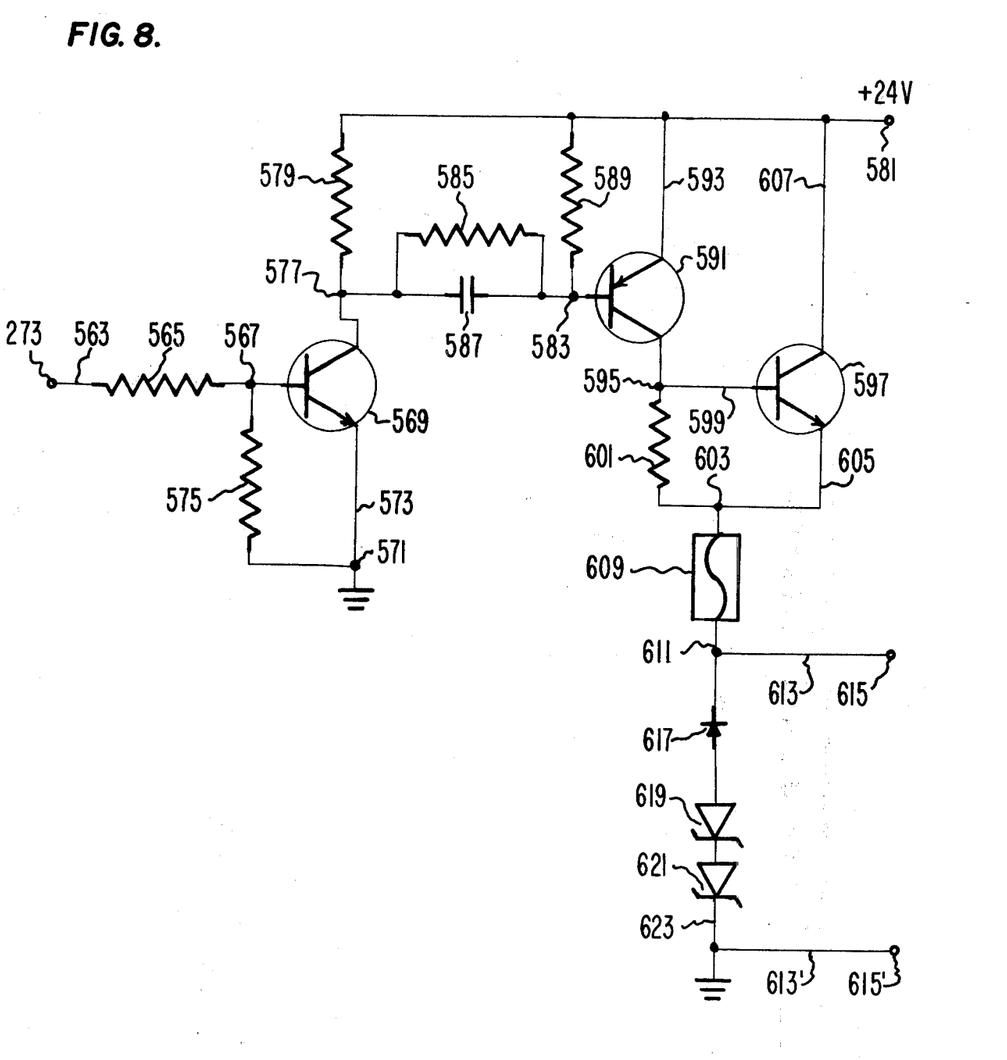
FIG. 8 is a schematic diagram of the dot printer drive circuit of block 53 of the simplified block diagram of FIG. 2.

A second source of clock pulses is designated by block 255 and may contain, for example, a 62.5 kilohertz oscillator or similar source of clock pulses. These clock pulses are supplied via lead 485 to the input of an inverter 487 whose output supplies clock pulses to a clock input node 489. The clock input node 489 is connected via lead 463 to the clock inputs of the D-type flip-flops 431 and 455 of the two-phase generator of block 245. Similarly, the clock pulses are supplied from clock node 289 to the CP clock input of a first four bit shift register 491 via lead 493 and to the clock input of a second for bit shift register 495 via lead 497. The four bit shift registers 491 and 495 may be, for example, standard TTL9300 shift registers, as known in the art, or any similar apparatus performing a similar function. The shift registers 491, 495 of the pulse width control circuit of block 259 operate to serve as a pulse width control system which generates and controls the width of the drive pulse used to energize the solenoid of the dot printer of block 43. The drive circuit itself is shown in FIG. 8. Each of the four bit shift registers 491 and 495 have associated therewith a set of preset inputs $P_0$, $P_1$, $P_2$, and $P_3$ and these inputs may be connected to either a source of positive voltage for presetting a binary one into the respective position of the shift register or to ground in order to preset a binary zero into a corresponding position of the shift register as known in the art. The count with which each of the shift registers 491 and 495 is preset can be determined depending upon the width of drive pulse required for the particular application depending systems conditions. In the current embodiment, for example, $P_0$ and $P_2$ of shift register 491 and $P_2$ and $P_3$ of shift register 495 were connected to ground while $P_1$ and MR of shift register 491 and $P_0$, $P_1$, and MR of shift register 495 were connected to a high or one signal. The "$Q_0$", "$Q_1$", and "$Q_2$" outpus of the first shift register 491 are connected via leads 499, 501 and 503 respectively to the three inputs of an AND gate 505 whose output is connected via lead 507 to one input of a NAND gate 509. The "$Q_0$", "$Q_1$" and "$Q_2$" outputs of the second shift register 495 are connected via leads 511, 513 and 515 respectively to the three inputs of an AND gate 517 whose output is connected via lead 519 to the second input of NAND gate 509. The output of NAND gate 509 is connected via lead 521 to output node 522. Node 522 is connected via lead 524 to one input of a NAND gate 523 whose output is connected via lead 525 to the "K" input to the first shift register 491. The second input to NAND gate 523 is taken via lead 527 from node 529 and node 529 is connected directly via lead 531 to the "J" input to the first shift register 491 and via lead 533 to the "$\overline{Q}_3$" output of the second shift register 495. The "$Q_2$" output to the first shift register 491 is also connected via lead 535 connected directly to the "J" input and to the "K" input of the second shift register 495. The output of NAND gate 509 is also connected via lead 543 to a node 545. Node 545 is connected via lead 539 to the input of an inverter 547 whose output is connected via lead 549 to a first input of NAND gate 555 whose second input is connected via lead 557 to the POR/ terminal 331 previously described. The third input to NAND gate 355 is connected to output node 361 via lead 559 which supplies the output of the dynamic shift register of block 251. The output of NAND gate 555 is connected to the PE parallel enable inputs of shift registers 491 and 495 via lead 561. Node 545 is also connected via lead 271 to the first driver output terminal 273.

FIG. 8 shows a schematic diagram of the wire printer driver circuit of block 53 of FIG. 2. Driver terminal 273 receives the pulse width controlled drive signal from the output of the pulse width control logic of block 259 of FIG. 7 and supplies the drive control pulse via lead 563 to one end of the resistor 565 whose opposite end is connected to node 567. Node 567 is connected directly to the base of a transistor 569 whos emitter is connected directly to a grounded node 571 via lead 573. Node 567 is also connected to the grounded node 571 through a resistor 575. The collector of transistor 569 is connected directly to a collector node 577 which is connected through a resistor 579 to a +24 volt source of potential which is tied to terminal 581. Node 577 is also connected to node 583 through the parallel combination of a resistor 585 and a capacitor 587. Node 583 is connected to the +24 volt source of potential of terminal 581 through a resistor 589. Node 583 is also connected directly to the base of a second drive transistor 591 whose emitter is connected directly to the +24 volt source of terminal 581 via lead 593 and whose collector is coupled directly to collector node 595. Collector node 595 is coupled directly to the base of a third drive transistor 597 via lead 599 and through a resistor 601 to a node 603. Node 603 is also connected directly to the emitter of transistor 597 via lead 605 and the collector of transistor 597 is connected directly to the +24 volt source of terminal 581 via lead 607. The output drive of transistors 591 and 597 are taken from node 603 which is connected through a one-half amp fuse 609 or similar protective means to a node 611. Node 611 is connected via lead 613 to a terminal 615 which is coupled to the solenoid 189 of FIG. 5 to control the energization or de-energization of the print solenoid in response to the signal arriving at input terminal 273. Node 611 is also connected to the cathode of a diode 617 whose anode is connected directly to the anode of a zener diode 619 whose cathode is connected to the anode of a second zener diode 621 whose cathode is in turn connected directly to ground via lead 623 for circuit protection and speed improvement purposes, as known in the art. A ground lead, 613' provides the ground signal to terminal 615' for connection to the solenoid coil of FIG. 5. It will be obvious that a single zener diode of increased performance capabilities could be substituted for zener diodes 619, 621.

The specific structure of th circuitry of FIGS. 7 and 8 do not form a part of the present invention and are provided only to show the embodiment presently contemplated by the inventor. The operation of the electrical system of the present invention will be described only broadly with specific reference to the block diagram of FIG. 6 and occasional reference to the schematics of FIGS. 7 and 8. The character read signals are supplied directly from the read head 31 to inputs 211, 213, 215 and 217 of the decode "can't read" logic of block 221 and when the input signals are decoded as a "can't read" signal, all ones, indicating that the character just read by the read head 31 could not be machine read, the "can't read" signal is supplied to AND gate 225 via lead 223. Simultaneously, a STROBE signal is supplied to input 231 of the asynchronous strobe buffer of block 229 indicating that the data currently available at inputs 211, 213, 215 and 217 represents new information just received from the read head which has not been previously processed. The output of the asynchronous strobe buffer of block 229 is clocked via lead 233 with the second phase output of the two-phase generator of block 245 so as to synchronize the strobe output pulse which is supplied via lead 227 to the second input of AND gate 225. The output of AND gate 225 is a signal which represents a "can't read" condition which has been recognized for the first time for the particular character just having been read and is properly synchronized for transfer into the dynamic shift register of block 251. Since the dynamic shift register of block 251 has a fixed number of stages, and since the location of the print station of block 43 is a fixed distance "d" from the location of the read head of block 31, and assuming that the document is transported from the read head of block 31 to the print station of block 43 at a predetermined constant speed, then the shifting of the particular "can't read" signals through the dynamic shift register of block 251 must be timed so as to insure that the "can't read" signal is supplied to the output lead 265 and to the input of AND gate 261 for initiating the drive pulse at output 273 at that point in time at which the character position in which a "can't read" signal was identified has traversed the distance "d" and arrived at the print position so as to insure that the mark is made at the proper character location so as to identify only the character or characters which could not be machine read. Since the dynamic shift register of block 251 has a predetermined number of stages, the speed at which the "can't read" signal is transferred through the shift register is the only means of controlling the timing of the print drive pulse and this is controlled by the combined operation of clock 237, the divide by "$n$" counter of block 239 and the two-phase generator of block 245. The two-phase generator provides the actual output clock signals $\phi_1$ and $\phi_2$ which control the entry, output and transfer of the "can't read" signal through the dynamic shift register of block 251. The frequency of occurrence of these pulses are controlled by the output of the divide by "$n$" counter and this frequency may be varied, by any means known in the art, so as to insure that the drive signal energizes the print solenoid at the precise time at which the character which could not be machine read is in the printing position so as to be properly marked and identified as the unique character which could not be machine read.

Although specific apparatus has been shown for the purpose of describing applicant's invention, it will be apparent to those skilled in the art that other variations and modifications in the specific structure illustrated may be made without departing from the spirit and scope of the present invention which is limited only by the appended claims.

I claim:

1. A document handling system for processing documents having characters encoded thereon comprising:

read station means for machine reading the characters encoded on each of said documents as said documents travel in a serial flow therethrough;

first transporting means for transporting said documents to said read station means in said serial flow;

means responsive to said read station means for generating a "can't read" signal when an encoded character on one of said documents cannot be machine read by said read station means;

marking station means for printing a mark on said one of said documents in a predetermined position with respect to said encoded character that could not be machine read by said read station means, without interruption in said serial flow;

second transporting means for transporting said documents from said read station means to said marking station means in said serial flow;

means responsive to said "can't read" signal for controlling said marking station means in time correlation with the passage of said one of said documents from said read station means to said marking station means for ensuring that said printed mark uniquely identifies said encoded character that could not be machine read by said read station means;

viewing station means for positioning said one of said documents having at least one printed mark thereon such that both the printed mark and the uniquely identified character associated therewith are visible to an operator; and third transporting means for transporting said documents from said marking station to said viewing station, said third means comprising, a first transport path feeding said viewing station means;

a second transport path bypassing said viewing station means;

gating means including a gating element positionable to a first position for diverting said documents into said first transport path and positionable to a second position for diverting said documents into said second transport path; and means for controlling said gating means and responsive to the presence of at least one of said "can't read" signals for positioning said gating element in said first position and responsive to the absence of said "can't read" signal for positioning said gating element in said second position.

* * * * *